Feb. 12, 1952   T. S. BAILEY, JR   2,584,976
APPARATUS FOR CONCENTRATING ORES AND THE LIKE
Filed Aug. 8, 1947   2 SHEETS—SHEET 2
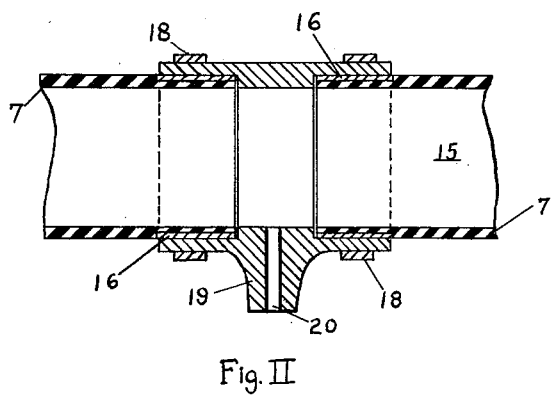
Fig. II
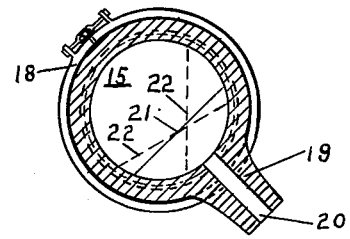
Fig. III
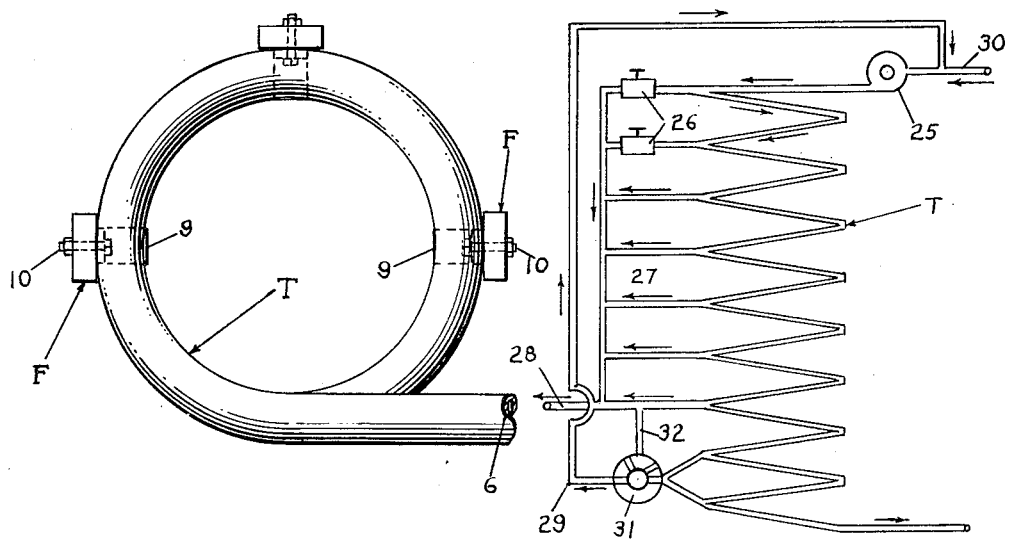
Fig. IV
Fig. V
THOMAS S. BAILEY JR.
INVENTOR.
BY
*H. A. McGrew*
ATTORNEY Patented Feb. 12, 1952

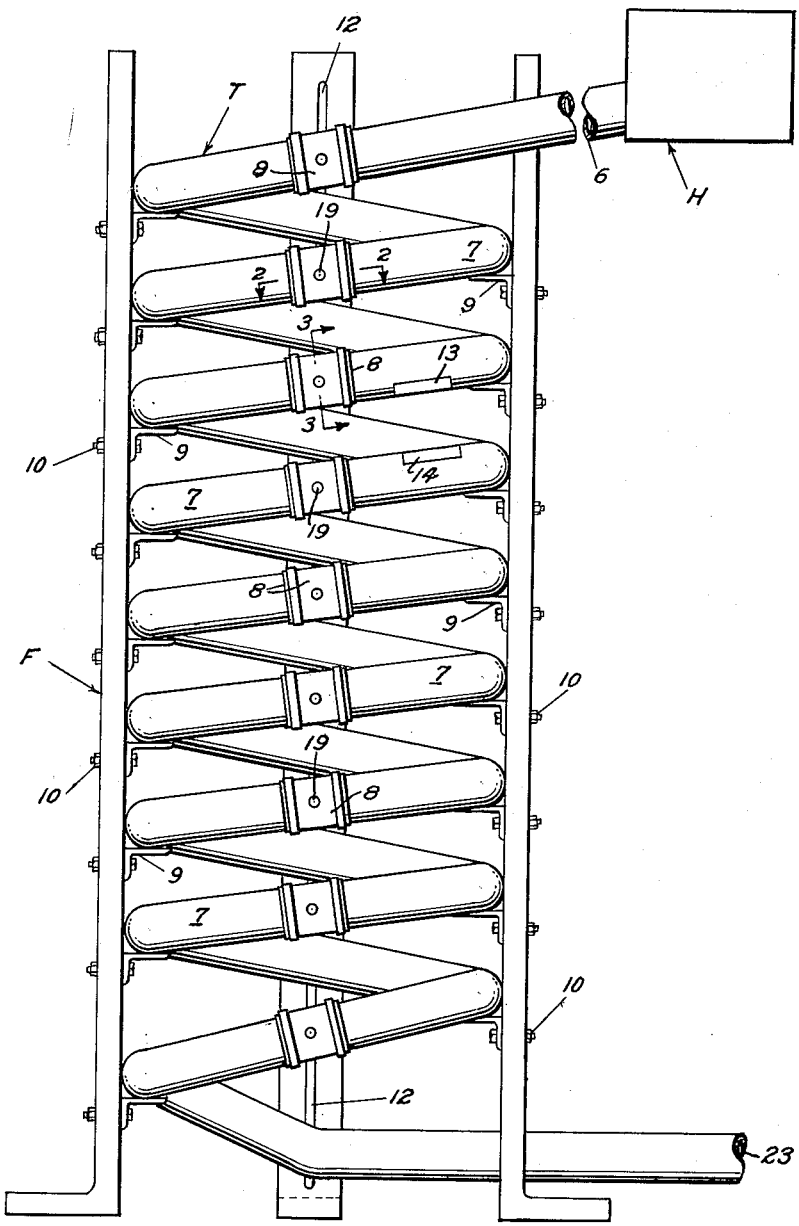

2,584,976

UNITED STATES PATENT OFFICE 2,584,976

APPARATUS FOR CONCENTRATING ORES AND THE LIKE

Thomas S. Bailey, Jr., Denver, Colo., assignor to Mining Process and Patent Company, Denver, Colo., a corporation of Delaware Application August 8, 1947, Serial No. 767,636

6 Claims. (Cl. 209—211)

This invention relates to concentrators for ore pulps or the like, and more particularly relates to concentrators of the type employing a gravity spiraling action in attaining the desired separation of constituent materials. The invention also relates to a concentration method for separating constituent solids of the material under treatment according to differences in specific gravity.

In the treatment of ore pulps having two or more constituents of different specific gravity, it is possible to obtain a stratification of the pulp constituents by passing the pulp along a downward spiraling course which causes the high specific gravity constituent to throw to the outside of the passageway to an extent sufficient to produce stratification of the constituents. As a consequence, the high specific gravity material may be drawn off from the outer surface of the passage while the low specific gravity material is retained in the passage and ultimately discharges as a waste or separate product at the end of the course. Heretofore, it has been the practice in performing such treatments to provide a trough-like structure for the retention of the material and to depend on gravitational fall for the movement of the material along the course.

It is an object of the present invention to provide simple, durable and efficient apparatus for concentrating ores or the like according to differences in specific gravity of the constituent materials.

Another object of the invention is to provide a simple, efficient and economical method of concentrating materials according to differences in specific gravity.

A further object of the invention is to provide a selective control of the stratifying action in a spiral centrifugal concentrator in order to permit recovery of any desired fraction of the pulp.

Other objects reside in novel details of construction and novel combinations and arrangements of parts, all of which will be fully described in the course of the following description.

Briefly stated, the present invention is based on the discovery that by varying the inclination of a spiral course along which the material under treatment passes and subjecting such material in the passage to pressures in excess of the normal hydrostatic pressure at the head of the course, it is possible to get a selective stratification of constituents of the material so as to separate and recover any desired fraction of the material.

A further discovery is that by oiling the particles of the pulp as in agglomeration, the material directed along the spiral course will stratify in such a way that the heavier mineral fraction is floated while the lighter gravity sand throws to the outside, thus separating the constituents so that the lighter material can be removed at intervals along the course, while the heavier material is discharged at the end of the course as a final concentrate of the separation.

The practice of the invention will be best understood by reference to the accompanying drawings. In the drawings, in the several views of which like parts have been designated similarly, Fig. 1 is a front elevation of a concentrator unit embodying features of my invention;

Fig. 2 is a section taken along the line 2—2, Fig. 1;

Fig. 3 is a section taken along the line 3—3, Fig. 1;

Fig. 4 is a top plan view of the unit shown in Fig. 1; and

Fig. 5 is a schematic view of one form of circuit arrangement which may be utilized in the practice of the present invention.

As shown in Fig. 1, the concentrator comprises a continuous, tubular body portion T suitably supported on a framework F in a position to receive feed through an intake opening 6 from a pump, head tank H or other source of supply. The tube T preferably comprises a series of sections 7 of flexible material, such as rubber, for example, which are interconnected by adjustable draw-off assemblies 8 as shown in Figs. 1 and 2.

The tube T is supported on frame F by a series of brackets 9 held by bolts 10 extending through vertical slots 12 in the frame. This arrangement permits sliding movement of the support to different vertical positions to vary the pitch of the spiral in any convolution. As a consequence, one inclination may be used to induce preliminary stratification, another to accelerate high grade concentration, and still another to induced rapid discharge in the final stages of the treatment.

In operating the concentrator, it is helpful, if not absolutely necessary, to have some means for observing stratification and shaping of the bed. A preferred arrangement for this purpose is to provide a transparent observation opening 13 (Fig. 1) of any suitable size and located at the bed level on the outer wall of the spiral. Such opening may be covered by glass, plastic or the like to maintain a fluid-tight enclosure for the material under treatment. Only one such opening has been illustrated, but it will be apparent that any number of such openings, located at suitable intervals, may be provided. Under some circumstances, a complete enclosure is not required and a top opening 14 may be provided to permit inspection at any suitable location.

Material fed to tube T from head tank H or other source of supply travels along the spiral passage 15 on the interior of the tube by gravity, and preferably under pressure in excess of the normal hydrostatic pressure at intake 6. This is best accomplished by use of a pump (not shown), although air or other gas under pressure may be delivered into the supply line to create the necessary pressure. As a consequence, a rapid spiralling movement is imparted to the pulp and under the centrifugal influence, the solids of greatest specific gravity are thrown to the outside and form a bed or strata of such high density that lighter solids cannot penetrate and if entrained are squeezed out in the rotational movement of the bed.

Sufficient stratification will usually occur within a few convolutions at the most and removal of the concentrate can begin as soon as any substantial strata is produced. The method of removal will be best understood by reference to Figs. 2 and 3. As shown in Fig. 2, the ends of each tube section 7 preferably will contain an annular stiffening member 16 and the ends of two adjoining sections 7 are inserted into a recess formed in the draw-off assembly 8 and held therein by clamping members 18. A nozzle portion 19 on the coupling has a discharge opening 20 of a predetermined size and shape to accommodate the longest particle size of the pulp. This opening is placed at approximately the midpoint of the high specific gravity bed and may be selectively positioned from time to time by loosening the clamps and rotating the nozzle to place the opening at proper angle to the bed.

In the usual operation, a pulp having two or more constituents of different specific gravity and preferably of substantially different specific gravity is delivered either from an elevated head tank or by a pump into the intake opening of the spiral passageway. Through either arrangement, a pressure in excess of the normal hydrostatic pressure at the opening is produced, and by normal hydrostatic pressure, I mean the pressure produced by a head of liquid located at the top level of the intake opening, but not substantially above the same. Also, such pressure presupposes the movement of the pulp through a zone sealed from the atmosphere so that the pressure thus created is not substantially reduced by exposure of the material to atmosphere. It will be understood that in effecting the desired separation and recovery, draw-off openings will be provided at intervals along the passage, but these openings are of such small volume compared to the size of the passage and at all times are substantially filled by the discharging material so that only a slight pressure reduction results from the movement of the material along the course.

On entering the spiral passage, the combined effect of the gravity fall and the aforesaid pressure serves to move the material at relatively high velocity and the spiralling contour of the course causes this high velocity material to throw to the outer wall of the tube where the differences in gravity of the constituent materials cause the high specific gravity fraction to penetrate to a greater extent and stratify.

In the initial sorting action, some entrainment of low specific gravity material will result, but in the progressive movement of the material, the bed so formed is constantly shifting under the centrifugal influence so that the lighter material is worked out of the bed by the denser material and a clean separation of the constituents is effected within a relatively short period of travel. The length of this interval will vary according to the material being treated, but in any event sufficient stratification is obtained within a few convolutions to commence the draw-off and the continuing movement of the material causes a progressive stratification.

Consequently, additional draw-off at intervals throughout the length of the course will produce a clean separation as between a high specific gravity material and a low specific gravity material. The aforementioned pressure condition assists in this action, particularly at the initial stratification stage where maximum pressures prevail. The diminishing pressure condition along the course resulting from the discharge to atmosphere through the nozzles 19 causes no efficiency loss since the bed in the later stages is sufficiently stratified so that little pressure is required in obtaining maximum sorting.

In the usual type of treatment, the treatment will involve a separation of mineral from gangue, as for example in the concentration of gold-bearing sands of a placer deposit. In such case, the gold being of much higher specific gravity, will deposit to the outside of the passage, while the lighter sands are maintained at the edge of the metallic strata. This will be best understood by reference to Fig. 3 wherein the segmental area 21 represents the location of the metallic strata and the dotted line areas 22 represent the sand strata.

However, it is possible to obtain a reverse type of concentration by oiling the particles of the pulp, as in an agglomeration treatment, before they are introduced into the spiral passageway. By so doing, the heavier metallic particles are caused to float on the sands and liquid of the pulp and the sands throw to the outside as a consequence, thus permitting their removal through the nozzles 21, while the residual product which is substantially a clean mineral discharges through the bottom outlet 23 (Fig. 1).

In the preceding description, reference has been made to the concentration of minerals and similar materials. In addition to the placer gold aforementioned, gold ore of various types may be efficaciously treated in this process and other materials, such as magnetite, ilmeniate, tungsten, platinum, lead and similar materials of high specific gravity may be treated. Usually, such materials will be naturally occurring, but it should be understood that other compositions such as the products of other processing operations in which the heavy metal is mixed with a waste material of different specific gravity can also be treated by this method.

It will be apparent from the foregoing description that a number of circuiting arrangements may be used in the practice of the invention. The simplest form is the operation previously described in which only one product is taken as the concentrate discharge through the several nozzles 19, while the second product discharges through the outlet 23. In the case of a gold-sand separation, for example, such a circuiting arrangement will be adequate. However, in the treatment of other materials, a more complex circuit may be required. For example, by observation, it may be determined that insufficient stratification is obtained in the uppermost convolution to provide a satisfactory product, in which case the uppermost nozzle 19 will be closed as by insertion of a plug in the opening 20, or by covering the end of a nozzle with a cap member (not shown). As soon as stratification is observed to be adequate, the nozzles are left open and the succession of draw-off openings may be used to provide a high grade, high specific gravity product. When this product has been depleted sufficiently by withdrawal, the combined discharges will be directed into a suitable receptacle while the remaining draw-off openings will be used to collectively provide another product of different grade, or in some instances, different composition. Where the difference is in grade only, the collected product of the lower discharges may be recycled to the feed end of the concentrator for further concentration by retreatment.

Such an arrangement has been illustrated in Fig. 5, in which the feed from a pump 25 enters the tubular passage T and the uppermost nozzles 20 are represented as being closed by valves 26. The product from the next five draw-off openings is delivered into a common line 27 and discharged through an outlet 28. The product from the remaining draw-off nozzles is delivered through another line 29 to the intake side of pump 25 where it joins a feed supply line 30 for mixing with incoming feed in its passage through the pump.

In order to provide a more flexible arrangement, it may be desirable to locate a four-way valve 31 at the entrance to line 29 so that when the product of the lower convolutions is observed to be of adequate grade for combining with the product discharging through outlet 28, the valve may be operated to direct this discharge into a branch line 32 and thence to outlet 28.

The aforementioned circuits are cited by way of illustration and not in limitation of the invention. The structure illustrated and described herein is cited as a typical embodiment of the practice of the invention, particularly as it utilizes the novel methods of my invention. Various modifications may be availed of within the spirit and scope of the invention, as set forth in the hereunto appended claims.

What I claim and desire to secure by Letters Patent is:

1. A concentrator for ore pulps or the like, comprising an upright flexible tube formed to provide a continuous spiral passage and having an intake opening in its elevated end portion and a discharge outlet for pulp constituents of lower specific gravity in the lower terminal portion of the body, conduit means for delivering pulp into said intake opening at a pressure in excess of the normal hydrostatic pressure at said opening, and members circumferentially adjustable on said flexible tube having valve-controlled outlets therein arranged at intervals along said spiral passage for the removal of stratified constituents of higher specific gravity.

2. A concentrator for ore pulps or the like, comprising an upright, hollow body formed to provide a continuous spiral passage and having an intake opening in its elevated end portion and a discharge outlet for pulp constituents of lower specific gravity in the lower terminal portion of the body, conduit means for delivering pulp into said intake opening at a pressure in excess of the normal hydrostatic pressure at said opening, and members circumferentially adjustable on said body having valve-controlled outlets therein arranged at intervals along said spiral passage for the removal of stratified constituents of higher specific gravity.

3. A concentrator for ore pulps or the like, comprising an upright flexible tube formed to provide a continuous spiral passage and having an intake opening at its elevated end and a discharge outlet for pulp constituents of lower specific gravity in the lower terminal portion of the body, vertically-adjustable, supporting means for said body at intervals throughout its length to vary the pitch of the passage, means for delivering a pulp to said intake opening under pressure, and members circumferentially adjustable on said flexible tube having outlets therein arranged at intervals along said spiral passage for the removal of stratified constituents of higher specific gravity.

4. A concentrator for ore pulps or the like, comprising an upright flexible tubular body formed to provide a continuous spiral passage and having an intake opening at its elevated end portion and a discharge opening for pulp constituents of lower specific gravity in the lower terminal portion of the body, said flexible body being formed of separate tubular sections, a connecting device joining said sections, each said device having an outlet formed therein and arranged to be adjustably positioned circumferentially of said tubular sections, conduit means for delivering pulp under pressure into said intake opening, and valve means at said outlets to control the removal of stratified constituents of higher specific gravity.

5. A concentrator for ore pulps or the like comprising an upright frame having its members disposed about a central axis, an upright flexible tube adjacent said frame formed to provide a continuous spiral passage and having an intake opening at its elevated end and a discharge outlet for pulp constituents in the lower terminal portions of the tube, radially extended support members on said frame adapted to support said tube in positions at variable distances from said central axis, means for delivering a pulp to said intake opening under pressure, and members circumferentially adjustable on said flexible tube having outlets therein arranged at intervals along said spiral passage for the removal of stratified constituents of the ore pulp.

6. A concentrator for ore pulps or the like comprising an upright frame having its members disposed about a central axis, an upright flexible tube adjacent said frame formed to provide a continuous spiral passage and having an intake opening at its elevated end and a discharge outlet for pulp constituents in the lower terminal portions of the tube, radially extended and vertically adjustable support members on said frame adapted to support said tube in positions at variable distances from said central axis and at various angles of pitch, means for delivering a pulp to said intake opening under pressure and members circumferentially adjustable on said flexible tube having outlets therein arranged at intervals along said spiral passage for the removal of stratified constituents of the ore pulp.

THOMAS S. BAILEY, JR.

REFERENCES CITED

The following references are of record in the file of this patent:

UNITED STATES PATENTS

| Number | Name | Date |
|---|---|---|
| 579,679 | Holmes | Mar. 30, 1897 |
| 694,420 | Rice | Mar. 4, 1902 |
| 833,251 | Schwab | Oct. 16, 1906 |
| 1,004,412 | Gilchrist | Sept. 26, 1911 |
| 1,023,750 | Morscher | Apr. 16, 1912 |
| 1,458,915 | Mumford | June 12, 1923 |
| 1,483,371 | Miller | Feb. 12, 1924 |
| 1,698,101 | Mantling | Jan. 8, 1929 |
| 2,214,905 | Kidwell | Sept. 17, 1940 |
| 2,431,559 | Humphreys | Nov. 25, 1947 |
| 2,431,560 | Humphreys | Nov. 25, 1947 |

FOREIGN PATENTS

| Number | Country | Date |
|---|---|---|
| 19,197 | Australia | Sept. 6, 1934 |

OTHER REFERENCES

Chem. and Met. Engr. for April 1945, pages 107–109.

Eng. and Min. Journal for Oct. 1943, pages 68–70.